US011077412B2

(12) United States Patent
Nicmanis et al.

(10) Patent No.: US 11,077,412 B2
(45) Date of Patent: Aug. 3, 2021

(54) APPARATUS AND METHOD FOR GENERATING A MICROFOAM

(71) Applicant: Triple Line Technology Limited, Cambridge (GB)

(72) Inventors: Mark Nicmanis, Cambridge (GB); Michelle Gothard, Royston (GB)

(73) Assignee: Triple Line Technology Limited, Cambridge (GB)

( * ) Notice: Subject to any disclaimer, the term of this patent is extended or adjusted under 35 U.S.C. 154(b) by 0 days.

(21) Appl. No.: 16/488,186

(22) PCT Filed: Feb. 22, 2018

(86) PCT No.: PCT/GB2018/050465
§ 371 (c)(1),
(2) Date: Aug. 22, 2019

(87) PCT Pub. No.: WO2018/158560
PCT Pub. Date: Sep. 7, 2018

(65) Prior Publication Data
US 2020/0023323 A1    Jan. 23, 2020

(30) Foreign Application Priority Data

Mar. 1, 2017   (GB) .................................... 1703299
Jun. 16, 2017  (GB) .................................... 1709667

(51) Int. Cl.
*B01F 3/04*    (2006.01)
*B05B 15/531*  (2018.01)
(Continued)

(52) U.S. Cl.
CPC .......... *B01F 3/04446* (2013.01); *B01F 5/065* (2013.01); *B01F 5/0606* (2013.01);
(Continued)

(58) Field of Classification Search
CPC .. B01F 3/04446; B01F 13/0022; B01F 5/065; B01F 5/0647; B01F 5/0606;
(Continued)

(56) References Cited

U.S. PATENT DOCUMENTS 2,119,906 A    6/1938  Dorman
4,027,789 A *  6/1977  Dickey .................. A61M 11/00
                                                     222/190

(Continued)

FOREIGN PATENT DOCUMENTS

CN    105749777 A  *  7/2016
CN    205570123 U  *  9/2016

(Continued)

OTHER PUBLICATIONS

English language abstract of PCT Patent Publication No. WO 2013/038502 A1, European Patent Office, dated Mar. 21, 2013.

(Continued)

*Primary Examiner* — Vishal Pancholi
*Assistant Examiner* — Bob Zadeh
(74) *Attorney, Agent, or Firm* — Dascenzo Gates Intellectual Property Law, P.C.

(57) ABSTRACT

An apparatus or method for generating a microfoam, the apparatus comprising a channel having an inlet and an outlet, a source of foamable liquid and pressurised gas arranged to feed into the inlet, wherein the channel is comprised of a spatially oscillating flow channel to provide an oscillating flow direction, the spatially oscillating flow channel oscillating about a bulk flow direction, the spatially oscillating flow channel providing a sequence of planar cross-sections perpendicular to the flow direction, with a sub-sequence of planar cross-sections that are perpendicular to the bulk flow direction in the plane in question, the (Continued)

sub-sequence comprising at least one plane that does not overlap with at least one other plane in the sub-sequence.

14 Claims, 9 Drawing Sheets

(51) Int. Cl.
| | |
|---|---|
| *B05B 15/55* | (2018.01) |
| *B01F 5/06* | (2006.01) |
| *B01F 13/00* | (2006.01) |
| *B05B 7/00* | (2006.01) |
| *B05B 7/04* | (2006.01) |
| *B65D 83/42* | (2006.01) |
| *B33Y 80/00* | (2015.01) |

(52) U.S. Cl.
CPC ........ *B01F 5/0647* (2013.01); *B01F 13/0022* (2013.01); *B05B 7/0025* (2013.01); *B05B 7/0483* (2013.01); *B05B 15/531* (2018.02); *B05B 15/55* (2018.02); *B65D 83/42* (2013.01); *B01F 2215/0014* (2013.01); *B33Y 80/00* (2014.12)

(58) Field of Classification Search
CPC ........... B01F 2215/0014; B01F 5/0408; B65D 83/42; B05B 7/0483; B05B 7/0025; B05B 15/55; B05B 15/531; B33Y 80/00; A47J 31/4485
See application file for complete search history.

(56) References Cited

U.S. PATENT DOCUMENTS

| | | | | |
|---|---|---|---|---|
| 4,316,673 | A * | 2/1982 | Speer | B01F 5/0609 366/337 |
| 4,390,281 | A * | 6/1983 | Scriminger | B01F 3/12 366/3 |
| 5,064,103 | A | 11/1991 | Bennett | |
| 5,069,881 | A * | 12/1991 | Clarkin | B01J 4/001 222/424 |
| 5,125,546 | A * | 6/1992 | Dunne | B01F 5/0416 222/394 |
| 5,741,466 | A * | 4/1998 | Bodnaras | B01J 8/08 422/228 |
| 5,780,087 | A | 7/1998 | Brady | |
| 5,939,122 | A | 8/1999 | Brady | |
| 6,280,615 | B1 * | 8/2001 | Phillips | C02F 1/72 210/198.1 |
| 6,558,035 | B2 | 5/2003 | Lane | |
| 6,810,795 | B1 * | 11/2004 | Hsu | A47J 31/4485 99/289 R |
| 7,416,327 | B2 | 8/2008 | Ghidini | |
| 7,690,536 | B2 | 4/2010 | Briozzo Fernandez | |
| 7,850,048 | B2 | 12/2010 | Arminak | |
| 8,225,965 | B2 | 7/2012 | Anninak | |
| 2004/0134557 | A1 * | 7/2004 | Cymbalisty | C10G 1/047 138/177 |
| 2006/0138171 | A1 | 6/2006 | Briozzo Fernandez | |
| 2007/0164047 | A1 * | 7/2007 | Reidt | A61C 9/0026 222/137 |
| 2007/0241060 | A1 * | 10/2007 | Kolb | C02F 11/00 366/176.1 |
| 2008/0257436 | A1 * | 10/2008 | Caro | F28F 1/08 137/808 |
| 2009/0122637 | A1 * | 5/2009 | Kruyer | B01F 5/0647 366/167.1 |
| 2009/0206109 | A1 | 8/2009 | Santagiuliana | |
| 2010/0206904 | A1 * | 8/2010 | Staub | B05C 17/00553 222/137 |
| 2010/0297327 | A1 | 11/2010 | Stangle | |
| 2010/0303971 | A1 | 12/2010 | Melms, Jr. et al. | |
| 2011/0284586 | A1 | 11/2011 | Kerr et al. | |
| 2012/0168533 | A1 | 7/2012 | Melms, Jr. et al. | |
| 2013/0175306 | A1 * | 7/2013 | Frailey | B01F 5/0608 222/402.18 |
| 2014/0097209 | A1 | 4/2014 | Kim | |
| 2014/0221501 | A1 * | 8/2014 | Wright | A61K 9/0019 514/723 |
| 2015/0165392 | A1 | 6/2015 | Fawcett et al. | |
| 2015/0208855 | A1 | 7/2015 | Jenkins | |
| 2015/0239645 | A1 * | 8/2015 | Eini | B01F 3/04446 222/1 |
| 2015/0360853 | A1 * | 12/2015 | Nicmanis | B65D 83/60 516/10 |
| 2020/0023323 | A1 * | 1/2020 | Nicmanis | B01F 13/0022 |

FOREIGN PATENT DOCUMENTS

| | | | | |
|---|---|---|---|---|
| DE | 3328530 A1 * | 2/1985 | | B01F 5/0647 |
| GB | 714844 A | 9/1954 | | |
| WO | WO 2013/038502 A1 | 3/2013 | | |

OTHER PUBLICATIONS

Search Report issued in connection with United Kingdom Patent Application No. GB 1709667.8, 1 page, United Kingdom Intellectual Property Office, dated Aug. 10, 2018.
"Milk Frothers: Which Whips Up the Best Coffee Topping?," Good Housekeeping, retrieved from www.goodhousekeeping.com/print-this/milk-frothers?page=all Nov. 15, 2013.
Foaming Soap Dispenser, Harriet Carter Jan. 16, 2011. Retrieved from Internet URL: <http://www.harrietcarter.corn/product/foaming-soap-dispenser-3886/#pr-header-back-to-top-link>.
Nescafe Frappe Kit. Christos Marketplace. Oct. 27, 2012. Retrieved from Internet Archive URL: <https://web.archive.org/web/20121027015500/http://www.christosmarket.com/Nescafe-Frappe-kit-p/neset.htm>.
The French Press. Coffee Kind. Nov. 8, 2008. Retrieved from Internet URL: <http://coffeekind.com/reading-room/blog/french-press-my-favorite-way-brew-perfect-coffee>.
Splenda French Vanilla Flavors for Coffee. Walmart. Feb. 6, 2012. Retreived from Internet Archive URL: <https://web.archive.org/web/20120206015249/http://www.walmart.com/ip/Splenda-French-Vanilla-Flavors-For-Coffee-30ct/10309714>.

* cited by examiner

APPARATUS AND METHOD FOR GENERATING A MICROFOAM

TECHNICAL FIELD

The present invention relates to a method and apparatus for generating a microfoam utilising a channel having an inlet and an outlet.

BACKGROUND AND PRIOR ART

Foams are two phase systems which consist of a continuous liquid or solid phase that surrounds discrete gas entities. The continuous phase of a foam typically contains a surfactant or stabiliser which prevents the bubbles from coalescing and hence hinders the bubbles from reverting back to a continuous gas phase and separating out of the foam. Microfoams can be defined as a special case of foams wherein the bubbles are typically smaller than 100 microns and have a low polydispersity (e.g. a standard deviation of less than 40 microns).

Methods and apparatuses for generating microfoams are known.

Mechanical whipping relies on the use of mechanical moving parts to use mechanical shear to reduce the bubble size, for example in a high shear mixer. Such mixers rely on rotation of a high-speed impeller or beater head to mix different phases and other ingredients. Head speeds in these devices are typically greater than 10,000 rpm.

Thus, known methods of generating microfoams are fairly expensive and bulky to manufacture and are not convenient for use as a disposable item, for example as part of consumer packaging.

Microfoams can also be generated by aerosol cans containing dissolved or liquefied gas propellants. However these are increasingly being perceived as problematic both environmentally and from a health and safety perspective.

US2015/0360853 A1 discloses a method of generating a microfoam by feeding a foamable liquid and a pressurised gas through a packed column. However a packed column is inconvenient as it can create dead zones which raise hygiene issues.

SUMMARY OF THE INVENTION

The present invention utilises a novel geometry comprising a spatially oscillating channel which has been found to provide a microfoam merely by introducing a foamable liquid and pressurised gas into an inlet. Under the appropriate conditions a microfoam is generated in the oscillating channel and exits out of an outlet of the channel.

In a first aspect, the invention relates to an apparatus for generating a microfoam, the apparatus comprising a channel having an inlet and an outlet, a source of foamable liquid and pressurised gas arranged to feed into the inlet, wherein the channel is comprised of a spatially oscillating flow channel to provide an oscillating flow direction, the spatially oscillating flow channel oscillating about a bulk flow direction, the spatially oscillating flow channel providing a sequence of planar cross-sections perpendicular to the flow direction, with a sub-sequence of planar cross-sections that are perpendicular to the bulk flow direction in the plane in question, the sub-sequence comprising at least one plane that does not overlap with at least one other plane in the sub-sequence.

In a second aspect, the invention relates to a method of generating a microfoam, the method employing an apparatus comprising a channel having an inlet and an outlet, the method comprising feeding a gas and a foamable liquid into the inlet of the channel under pressure, wherein the channel is comprised of a spatially oscillating flow channel to provide an oscillating flow direction, the spatially oscillating flow channel oscillating about a bulk flow direction, the spatially oscillating flow channel providing a sequence of planar cross-sections perpendicular to the flow direction, comprising a sub-sequence of planar cross-sections that are perpendicular to the bulk flow direction in the plane in question, the sub-sequence comprising at least one plane that does not overlap with at least one other plane in the sub-sequence.

Thus, by employing a spatially oscillating geometry and under appropriate feed pressure, the foamable liquid and gas form a microfoam. This is believed to be because the spatially oscillating channel provides a particular shear environment that produces the microfoam due to the oscillations.

For any given microfoam a particular range of gas-to-liquid-ratio will need to be achieved. This can easily be obtained by varying the source pressures and/or the resistances of the flow channels of the gas and liquid respectively using methods known to the person skilled in the art.

The spatially oscillating flow channel is therefore static but oscillates in space to provide a flow direction that continually changes direction about a bulk flow direction.

Because the apparatus and method does not involve moving parts it can be made relatively cheaply and at essentially any scale. This allows it to be used on small scale dispensing applications through to industrial applications.

In the context of the present invention, two planes "do not overlap" if there is no line that is perpendicular to one plane in question that passes through the other plane.

The channel comprises a bulk flow direction, onto which the spatially oscillating flow channel oscillates. The bulk flow direction can be considered to be the general flow direction of the channel if the oscillations were not present. Thus the spatially oscillating flow channel continually changes direction, generally to either side of the bulk flow direction, which is believed to be essential for the generation of the microfoam. Geometries which involve curvature but do not spatially oscillate about a bulk flow direction such as arcs, helices and spirals do not produce microfoams by themselves. This is because they do not involve a changing of direction about a bulk flow direction.

The spatially oscillating flow channel may comprise a regular repeating pattern or it may involve random elements or irregular dimensions, provided it oscillates about a bulk flow direction.

The cross-section of the oscillating flow channel may take any geometry but is typically a regular shape such as rectangular, circular, ovate, diamond or the like.

The spatially oscillating flow channel comprises a single flow channel between the inlet and outlet. This means that the gas and liquid entering the inlet flow together along a single flow path until they reach an outlet.

This means that the spatially oscillating flow channel is a single channel with no splits and re-merging of channels. A single oscillating channel with an inlet and outlet provides advantages over devices that do comprise junctions. For example it minimizes or prevents the appearance of dead zones.

However this single flow channel may comprise additional inlets which introduce liquid and/or gas into the single flow channel. Additionally the single flow channel may comprise additional outlets, so that some of the flow splits before leaving the apparatus via one of the outlets. However, if the flow splits in this way then the split fluids do not get re-merged together downstream and simply leave the apparatus via an exit. In this way the advantages of a single directed flow path are maintained in the apparatus, despite the possible presence of more than one inlet and outlet.

However, a plurality of single spatially oscillating flow channels may be grouped together in parallel to increase throughput as desired.

It has been found that providing the average cross sectional area of the spatially oscillating flow channel to be from 0.5 to 5 mm$^2$ gives good results.

Preferably, the sub sequence comprises at least one plane that doesn't overlap with either of the two planes in the sub sequence adjacent to it.

In a preferred embodiment at least 10 planes in the subsequence, preferably at least 20, more preferably at least 40, do not overlap with either of the two planes in the sub sequence adjacent to them. However it has been found that above a certain number there are diminishing returns in the quality of the produced foam. Therefore preferably there are less than 1000 planes, preferably less than 200, more preferably less than 100, in the subsequence that do not overlap with either of the two planes in the subsequence adjacent to them.

Preferably substantially all of the planes in the subsequence do not overlap with either of the two planes in the sub sequence adjacent to them.

In some embodiments, the average distance between planes in the sub-sequence is from 0.5 to 20 mm.

The gas may comprise air, nitrogen, hydrocarbon, carbon dioxide, nitrous oxide, or in fact any compound or mixture of compounds in their vapour phase that a user may wish to incorporate into the bubbles of the microfoam.

Microfoams have many characteristics which make them relevant to a wide range of industrial, commercial, domestic and medical applications which include, but are not limited to: soap based foams, shaving foams, skin creams, sunscreens, coffee crema and latte foams, hair care products, surface cleaning formulations, whipped creams, dairy foams (including ice cream), culinary foams, bakery and confectionery products, thermal and acoustic insulation, building materials, lightweight packaging and space filling materials. A preferred microfoam is based on dairy products, e.g. milk and/or cream or synthetic equivalents.

Microfoams are also useful in processes where a large gas/liquid interfacial area may be beneficial, for example in gas/liquid separation processes such as gas scrubbing or in gas/liquid reaction processes such as those occurring in fuel cells.

The apparatus may be formed from a wide range of materials including plastics (e.g. polypropylene, PET, polyethylene, ABS, nylon, PLA, PVC, Teflon™, Acrylic, polystyrene, PEEK etc.) metals, glass, engineered fibre matrices or any other material that can be molded, milled, printed, cast, machined, sintered, etched, carved, forged, blown, pressed, stamped, electron beam machined, laser cut, laminated and formed into the appropriate shape.

In cases where a very low cost disposable (or perhaps single use) device is required then many of the plastics may be more suitable since they are low cost, may be recyclable, and suitable for high volume manufacturing methods such as injection moulding. A reusable device may be required in other applications, for example a milk foaming module within a retail coffee dispenser or a processing line manufacturing a foamed food product. In such cases metal, ceramic or glass (perhaps supported by a surrounding structure) may be more appropriate since they are more resistant to chemical and mechanical cleaning, heat treatments, steam cleaning, autoclaving and integration.

The current invention can be used as single geometric channels for the generation of low to medium volumetric flows of microfoam, or a number of foamer units can be run in parallel to achieve higher volumetric flows more suited to industrial and manufacturing applications.

In one preferred embodiment the apparatus comprises a pressurised container comprising an openable and closable outlet, the container containing the foamable liquid and gas under pressure, the apparatus arranged to deliver the foamable liquid and gas to the inlet of the spatially oscillating channel, the outlet of which is coupled to the openable and closable outlet of the apparatus, such that when the openable and closable outlet is opened, the pressure difference between that inside the container and the pressure at the outlet is sufficient to drive the foamable liquid and gas into the inlet, thereby generating a microfoam which exits the outlet and, in turn, the openable and closeable outlet of the apparatus.

The invention will now be illustrated with reference to the following figures, in which.

EXAMPLES

Figure 1:
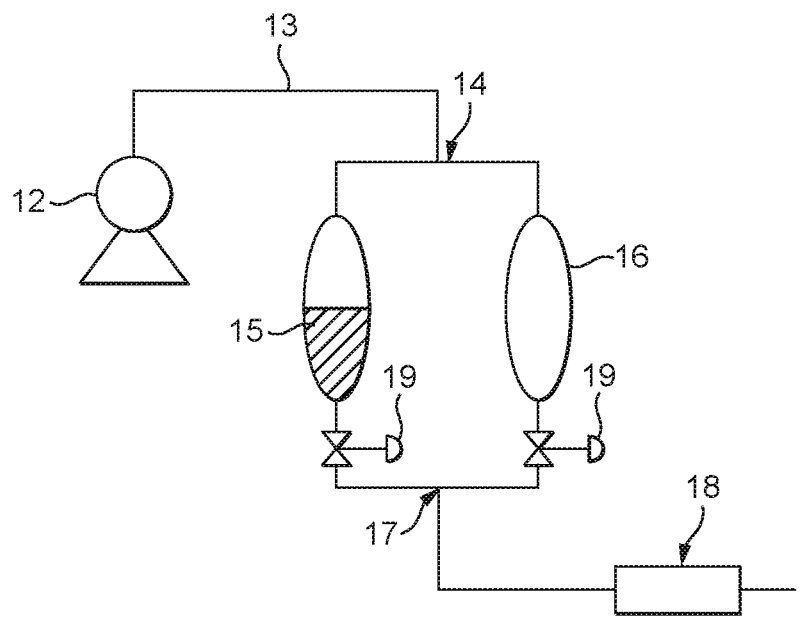
FIG. 1 is a schematic representation of the apparatus used to generate the microfoams in the examples.

Turning to the figures, FIG. 1 shows a diagram of the experimental rig. A compressor 12 was used to supply pressurized air via 2.5 mm ID tubing 13 to a T-connector 14 which supplies pressurized air to a vessel containing surfactant loaded liquid 15 (the liquid vessel) and a vessel containing only gas 16 (the gas vessel). Tubing (2.5 mm ID) connects the outlet of both vessels to a second T-connector 17 which was in turn connected (via 2.5 mm ID tubing) to the micro-foam generating device 18. The liquid vessel is oriented so that the tubing connected to the compressor feeds into the headspace of the liquid vessel and the tubing leading to the micro-foam generating devices is connected to the liquid vessel below the liquid line. In FIG. 1 connector 17 is a T-connector, however, a Y-connector or other geometry connector that provides the correct gas-liquid ratio, preferably as intermittent packets that span the gas-liquid conduit leading to the microfoam generating device.

Each of the 3 classes of geometries exemplified herein (zigzag, notch and serpentine) were printed on a 3d-printer out of PLA and contained in plastic casing to contain pressure. Tubing was connected to the casing via a quick-fit which led to the inlet port of the micro-foam generation devices. Needle valves 19 were installed in the lines between the outlets of the pressure vessels and the inlet of the T-connector leading to the micro-foam generating device so that the flow-rates of liquid and gas could be adjusted.

When the compressor was switched on, the gas vessel and the headspace of the liquid vessel were pressurized causing gas to flow out of the gas vessel and liquid to flow out of the liquid vessel through the needle valves and into the second T-connector where they were combined into a gas/liquid mixture which was forced through the micro-foam generating devices. The needle valves were adjusted to supply gas and liquid at a range of different flow-rates to the micro-foam generating devices. In cases where a microfoam was achieved, air and gas ratios could be varied to create microfoams with a range of liquid to gas ratios, generating products with a range of textures from fluid-like wet foams to very stiff dry foams. The maximum air inclusion values are reported in the following examples.

It was found that in order to generate a microfoam for foamable fluids with a viscosity of 1 cp superficial liquid velocities were preferably in the range: 500-750 mm/s (most of the data lay in this range), next most preferably in the range 250-1500 mm/s (all of the data lay in this range).

In order to generate microfoams with higher viscosities (5-50 cP) superficial liquid velocities were preferably in the range 500-2000 mm/s (most of the data lay in this range), next most preferably in the range 500-2500 mm/s (all of the data lay in this range). Superficial liquid velocity=(volumetric flow-rate of foamable fluid)/(minimum cross-sectional area in the flow channel).

The viscosities of the liquids tested were as follows: Fairy™ liquid (diluted 1 part in 10 parts water): 1 cp, skim milk (<0.3% fat): 5 cp, whipping cream (39.8% fat): 50 cp.

Each foamer was tested with dilute Fairy™ liquid, a dishwashing liquid available in the UK which is predominantly sodium lauryl sulphate (1 part Fairy™ liquid: 10 parts water) at 25° C. The compressor pressure was set at 5 bar. In each case the air phase volume contained in the final microfoam was >95%. Test conditions and the instances where micro-foams were generated are recorded in table 1.

TABLE 1

| Embodiment | Foamer geometry | Result |
| --- | --- | --- |
| 1 | S(1.5, 0.75, 2, 225, 55) | Smooth Microfoam |
| 2 | S(1.25, 0.50, 2, 180, 66) | Smooth Microfoam |
| 3 | S(1.25, 0.50, 2, 90, 128) | Spluttery mixture |
| 4 | S(1.5, 0.75, 2, 180, 48) | Smooth Microfoam |
| 5 | S(1.5, 0.75, 2, 90, 72) | Smooth Microfoam |
| 6 | S(1.75, 1, 2, 90, 57) | Smooth Microfoam |
| 7 | S(3.2, 1.45, 2, 180, 22) | Smooth Microfoam |
| 8 | S(2, 1.25, 2, 90, 47) | Smooth Microfoam |
| 9 | S(3.5, 2.75, 2, 180, 32) | Smooth Microfoam |
| 10 | S(3.5, 2.75, 2, 90, 24) | Smooth Microfoam |
| 11 | S(3, 2.25, 2, 90, 57) | Smooth Microfoam |
| 12 | S(4, 3.25, 2, 180, 28) | Smooth Microfoam |
| 13 | S(4, 2.25, 2, 180, 38) | Smooth Microfoam |
| 14 | Z(1.37, 2, 0.61, 160, 4, 100) | Spluttery mixture |
| 15 | Z(1.73, 2, 0.96, 160, 8, 50) | Smooth Microfoam |
| 16 | Z(1.58, 2, 0.8, 150, 4, 128) | Smooth Microfoam |
| 17 | Z(1.80, 2, 0.98, 140, 4, 128) | Smooth Microfoam |
| 18 | Z(2.32, 2, 1.41, 120, 4, 50) | Smooth Microfoam |
| 19 | Z(4.75, 2, 3.56, 90, 6.63, 48) | Smooth Microfoam |
| 20 | Z(7.08, 2, 3.78, 90, 7.06, 25) | Smooth Microfoam |
| 21 | Z(2, 2, 1.25, 113, 3, 65) | Smooth Microfoam |
| 22 | Z(4, 2, 1.45, 90, 4, 49) | Spluttery mixture |
| 23 | Z(4, 2, 2.05, 90, 4, 49) | Smooth Microfoam |
| 24 | Z(4, 2, 2.25, 73, 3, 65) | Smooth Microfoam |
| 25 | N(2, 2, 0.85, 0.5, 1, 66) | Spluttery mixture |
| 26 | N(2, 2, 2.05, 0.5, 1, 66) | Smooth Microfoam |
| 27 | N(2, 2, 1.25, 0.5, 1, 66) | Smooth Microfoam |
| 28 | N(2, 2, 1.25, 0.5, 10, 57) | Smooth Microfoam |
| 29 | N(2, 2, 1.25, 2, 1, 33) | Smooth Microfoam |
| 30 | N(3, 2, 2.25, 0.5, 1, 66) | Smooth Microfoam |
| 31 | N(4, 2, 1.45, 0.5, 1, 66) | Spluttery mixture |
| 32 | N(4, 2, 1.85, 0.5, 1, 66) | High speed flow containing gas pockets and large bubbles |
| 33 | N(4, 2, 2.05, 0.5, 1, 66) | Smooth Microfoam |
| 34 | N(4, 2, 2.25, 0.5, 1, 66) | Smooth Microfoam |
| 35 | N(4, 2, 3.25, 0.5, 1, 66) | Smooth Microfoam |
| 36 | N(6, 2, 1.75, 0.5, 1, 66) | Spluttery mixture |
| 37 | N(6, 2, 2.25, 0.5, 1, 66) | Spluttery mixture |
| 38 | N(6, 2, 2.65, 0.5, 1, 66) | High speed flow containing gas pockets and large bubbles |
| 38a | N(6, 2, 3.05, 0.5, 1, 134) | Smooth Microfoam |
| 39 | N(6, 2, 3.25, 0.5, 1, 66) | Smooth Microfoam |
| 40 | N(6, 2, 4.25, 0.5, 1, 66) | Smooth Microfoam |
| 41 | N(8, 2, 2.75, 0.5, 1, 66) | Spluttery mixture |
| 42 | N(8, 2, 3.25, 0.5, 1, 66) | High speed flow containing gas pockets and large bubbles |
| 42a | N(8, 2, 3.75, 0.5, 1, 66) | High speed flow containing gas pockets and large bubbles |
| 42b | N(8, 2, 4.05, 0.5, 1, 66) | Smooth Microfoam |

For a select number of geometries the examples were repeated with chilled (5° C.) skim milk (fat content of ~1%). Initially the compressor pressure was set at 5 bar, however this was repeated at 8 bar if no microfoam was produced. The results are shown in Table 2.

TABLE 2

| Embodiment | Foamer geometry | Pressure (bar) | Maximum Air phase volume (%) | Result |
| --- | --- | --- | --- | --- |
| 34 | N(4, 2, 2.25, 0.5, 1, 66) | 5 | 80.00% | Smooth Microfoam |
| 35 | S(1.5, 0.75, 2, 180, 48) | 5 | 80.00% | Smooth Microfoam |
| 36 | Z(4, 2, 2.25, 73, 3, 65) | 5 | 80.00% | Smooth Microfoam |
| 37 | N(6, 2, 2.65, 0.5, 1, 66) | 5 & 8 | — | Spluttery mixture |
| 38 | N(2, 2, 0.85, 0.5, 1, 66) | 5 & 8 | — | Spluttery mixture |
| 39 | Z(4, 2, 1.45, 90, 4, 49) | 5 & 8 | — | Spluttery mixture |

For a select number of geometries the examples were repeated with chilled (4° C.) whipping cream (fat content of 38%). Initially the compressor pressure was set at 5 bar, however this was repeated at 8 bar if no microfoam was produced. The results are shown in Table 3.

TABLE 3

| Embodiment | Foamer geometry | Pressure (bar) | Maximum Air phase volume (%) | Result |
| --- | --- | --- | --- | --- |
| 3 | S(1.25, 0.50, 2, 90, 128) | 5 & 8 bar | — | Spluttery mixture |

TABLE 3-continued

| Embodiment | Foamer geometry | Pressure (bar) | Maximum Air phase volume (%) | Result |
|---|---|---|---|---|
| 4 | S(1.5, 0.75, 2, 180, 48) | 8 | 43.00% | Smooth flow of whipped cream |
| 5 | S(1.25, 0.50, 2, 180, 66) | 5 | 38.90% | Smooth flow of whipped cream |
| 6 | Z(4, 2, 2.05, 90, 4, 49) | 5 | 45.00% | Smooth flow of whipped cream |
| 7 | N(2, 2, 1.25, 0.5, 1, 66) | 5 | 49.00% | Smooth flow of whipped cream |
| 8 | N(4, 2, 1.45, 0.5, 1, 66) | 5 & 8bar | — | Spluttery mixture |
| 9 | Z(4, 2, 2.05, 90, 4, 49) | 5 & 8bar | 58.00% | Smooth flow of whipped cream |
| 34 | N(4, 2, 2.25, 0.5, 1, 66) | 5 | 58.00% | Smooth flow of whipped cream |

In the case of the dairy products (skim milk, cream) there was a dependency of microfoam degenerating performance related to product temperature. Around 7° C. the foamability and microfoam stability of milk and cream appeared to deteriorate in line with observations elsewhere in the dairy literature.

Figure 2:
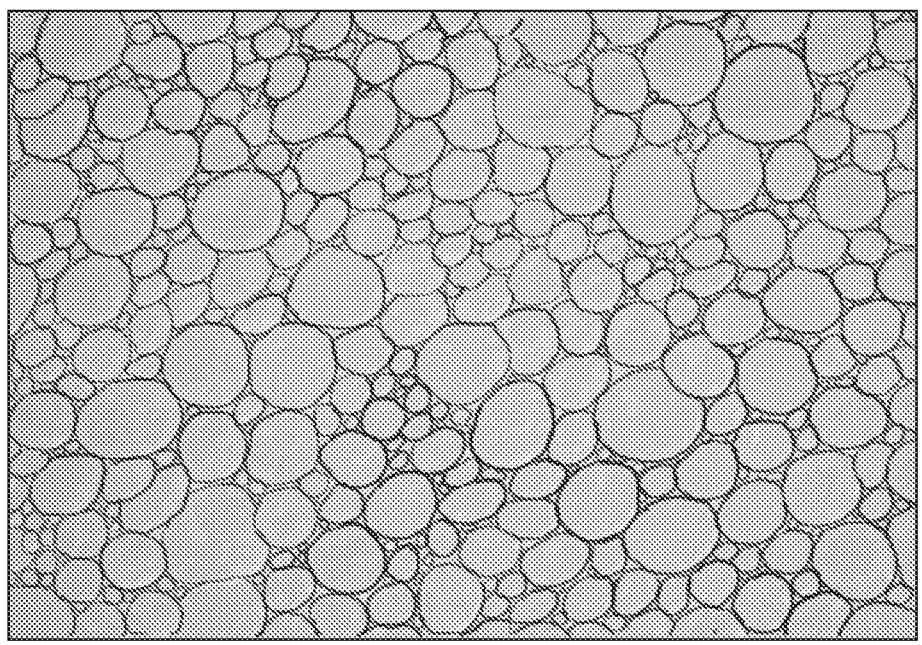
FIG. 2 is an image of a microfoam produced by an apparatus according to the present invention.

In cases where micro-foams were generated, measurements were made of the liquid flow-rate and the gas phase volume in the micro-foam. A sample of the diluted Fairy™ liquid micro-foam generated by the notch foamer was collected in a petri-dish. The petri-dish was inverted and a microscope image was captured from above (through the glass). The image was captured within 3 seconds of the sample being collected. This microscope image is shown in FIG. 2. The microscope images were converted into a bubble size distribution which was found to have a mean of 39.2 microns and a standard deviation of 25.21 microns.

In Table 1 it can be seen that the notch, zigzag and serpentine foamers also proved capable of generating a micro-foam from dilute Fairy™ liquid.

The notch foamer also proved capable of generating a very fine and uniform bubble structure (a mean bubble size of 39.2 microns with a standard deviation of 25.21 microns). A total of 354 bubbles were sized to generate these statistics.

In tables 2 and 3, it can be seen that the notch, zigzag and serpentine foamers were capable of generating a micro-foam from chilled skim milk and whipping cream. In the case of the notch foamer the maximum air content of the whipped cream was 58% which is close to the maximum air content achievable by mechanical whipping.

Nomenclature of Foamer Test Geometries

A large proportion of the testing was performed on variants of 3 foamer geometries (zigzag, notch and serpentine). The foamer geometry mentioned in the tables has been introduced so that the foamers may be concisely and unambiguously referenced.

Figure 3:
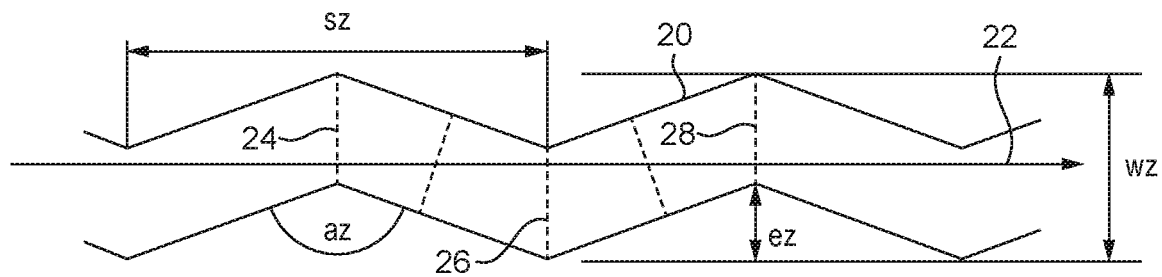
FIG. 3 is a plan view of a zigzag apparatus comprising an oscillating flow path falling outside the present invention.

1) ZigZag foamers: consist of a rectangular channel of width "wz" and depth "dz" (measured in a direction perpendicular into the page). A ZigZag shaped flow channel is created by extending triangular prisms (with an isosceles triangle shaped base) into the flow channel as shown in FIG. 3. The prisms extend a distance "ez" into the channel and the distance between adjacent apices is denoted "sz". The angle between the identical faces of the triangles is denoted "at" degrees and the total number of triangles contained within the foamer is denoted "nt". The nomenclature Z(wz, dz, ez, az, sz, nz) will denote that a foamer has a zigzag geometry with parameters as specified above.

Figure 4:
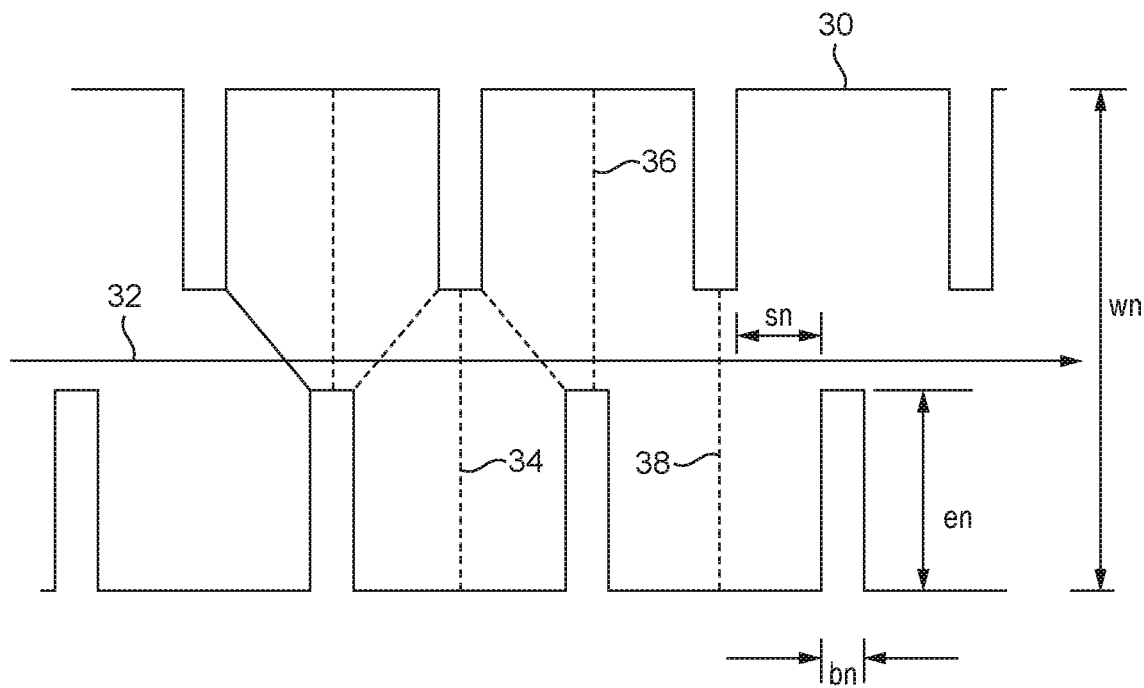
FIG. 4 is a plan view of a notch apparatus comprising an oscillating flow path falling outside the present invention.

2) Notch foamers: consist of a rectangular channel of width "wn" and depth "dn" (measured in a direction perpendicular into the page). Regularly spaced notches (rectangular prisms) extend into the channel a distance "en" from opposite sides in an alternating arrangement as shown in FIG. 4. The breadth of the notches is "bn" and the spacing between notches is "sn" and the total number of notches in the geometry is "nn". These parameters are shown in FIG. 4. The nomenclature N(wn, dn, en, bn, sn, nn) will denote that a foamer has a notch geometry with parameters as specified above.

Figure 5:
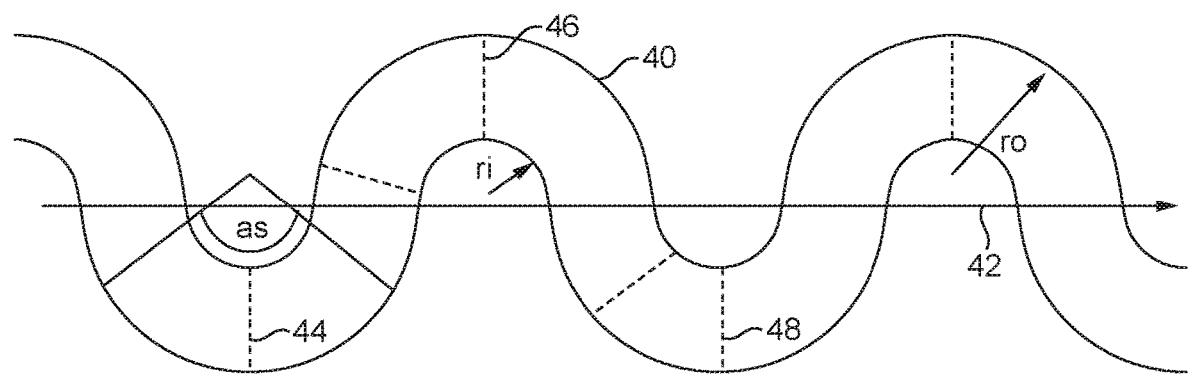
FIG. 5 is a plan view of a serpentine apparatus comprising an oscillating flow path according to the present invention.

3) Serpentine foamers: curved flow-channels were defined as the region swept out by an arc of "as" degrees between two concentric cylinders of radii "ri" and "ro" and height "ds". The serpentine foamers were created by connecting a total number of "ns" flow-channels together as shown in FIG. 5. The nomenclature S(ro, ri, ds, as, ns) will denote that a foamer has a serpentine geometry with parameters as specified above.

An example of a zigzag geometry that falls outside the scope of the invention is shown in FIG. 3 which shows a plan view of an oscillating flow path 20 that has a varying rectangular cross-section throughout and oscillates spatially about a bulk flow direction shown by arrow 22. It will be noted that there is a sub-sequence of a number of planar cross-sections 24, 26, 28 that are perpendicular to the bulk flow direction. However, it will also be noted that plane 26 in the sub-sequence overlaps with planes 24 and 28 and therefore falls outside the scope of the present invention. Nevertheless, if the parameter ez was increased, then the geometry could then fall inside the invention when plane 26 no longer overlapped with planes 24 or 28.

An example of a notch geometry that falls outside the scope of the invention is shown in FIG. 4, which shows a plan view of an oscillating flow path 30 that has an essentially constant rectangular cross-section throughout and oscillates spatially about a bulk flow direction shown by arrow 32. It will be noted that there is a sub-sequence of a number of planar cross-sections 34, 36, 38 that are perpendicular to the bulk flow direction. However, it will also be noted that plane 36 in the sub-sequence overlaps with planes 34 and 38 and therefore falls outside the scope of the present invention. Nevertheless, if the parameter en was increased so that it was greater than wn/2, then the geometry would then fall inside the invention when plane 36 no longer overlapped with planes 34 or 38.

An example of a serpentine geometry that falls inside the scope of the invention is shown in FIG. 5, which shows a plan view of an oscillating flow path 40 that has an essentially constant rectangular cross-section throughout and oscillates spatially about a bulk flow direction shown by arrow 42. It will be noted that there is a sub-sequence of a number of planar cross-sections 44, 46, 48 that are perpendicular to the bulk flow direction. It will also be noted that plane 46 in the sub-sequence does not overlap with planes 44 and 48 and therefore falls inside the scope of the present invention.

Figure 6:
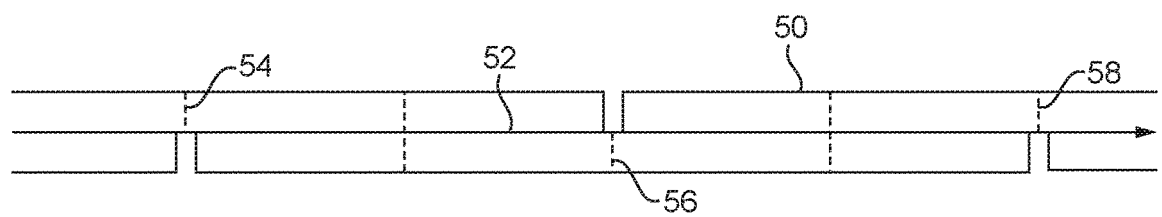
FIG. 6 is a plan view of a notch apparatus comprising an oscillating flow path according to the present invention.

An example of a notch geometry that falls inside the scope of the invention is shown in FIG. 6, which shows a plan view of an oscillating flow path 50 that has a rectangular cross-section throughout and oscillates spatially about a bulk flow direction shown by arrow 52. It will be noted that there is a sub-sequence of a number of planar cross-sections 54, 56, 58 that are perpendicular to the bulk flow direction. It will also be noted that plane 56 in the sub-sequence does not overlap with planes 54 and 58 and therefore falls inside the scope of the present invention.

Figure 7:
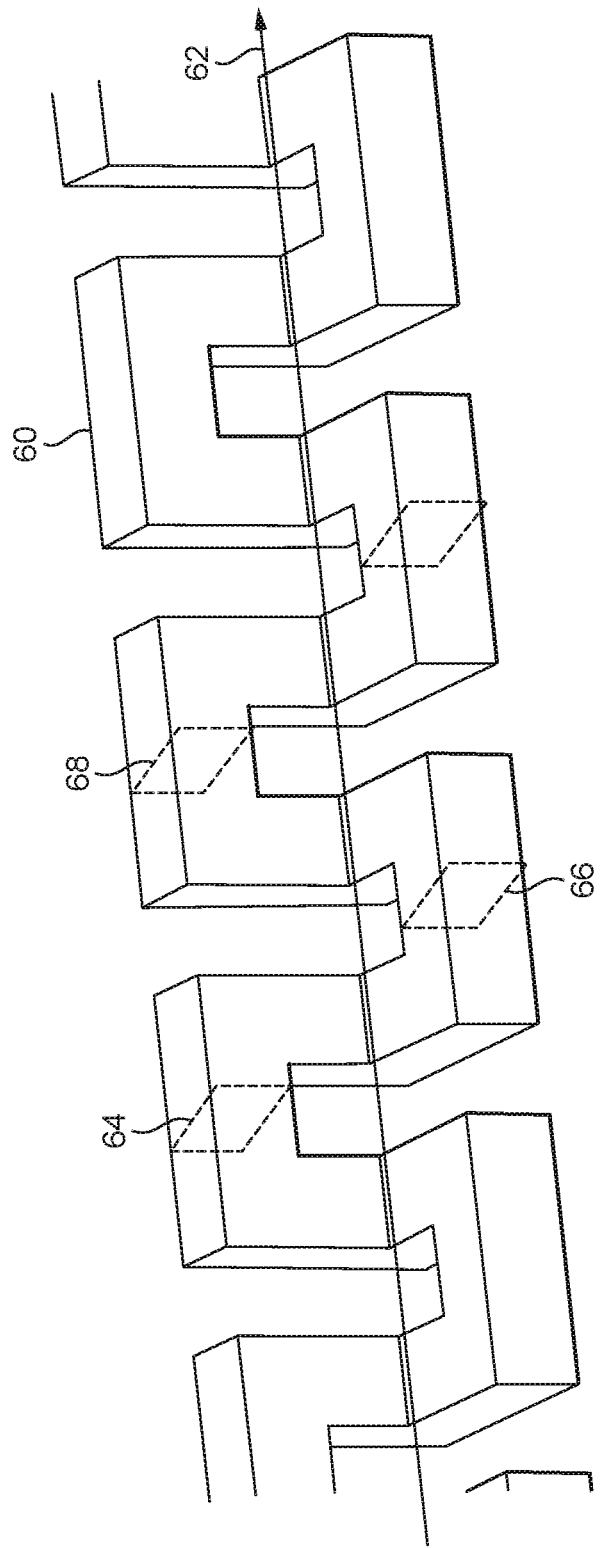
FIG. 7 is a perspective view of an apparatus comprising an oscillating flow path according to the present invention.

An example of a geometry that oscillates in two dimensions spatially, is shown in FIG. 7, which shows an oscillating flow path 60 that has an essentially constant rectangular cross-section throughout and oscillates spatially about a bulk flow direction shown by arrow 62. It will be noted that there is a sub-sequence of a number of planar cross-sections 64, 66, 68 that are perpendicular to the bulk flow direction. It will also be noted that plane 66 in the sub-sequence does not overlap with planes 64 and 68 and therefore falls inside the scope of the present invention.

Figure 8:
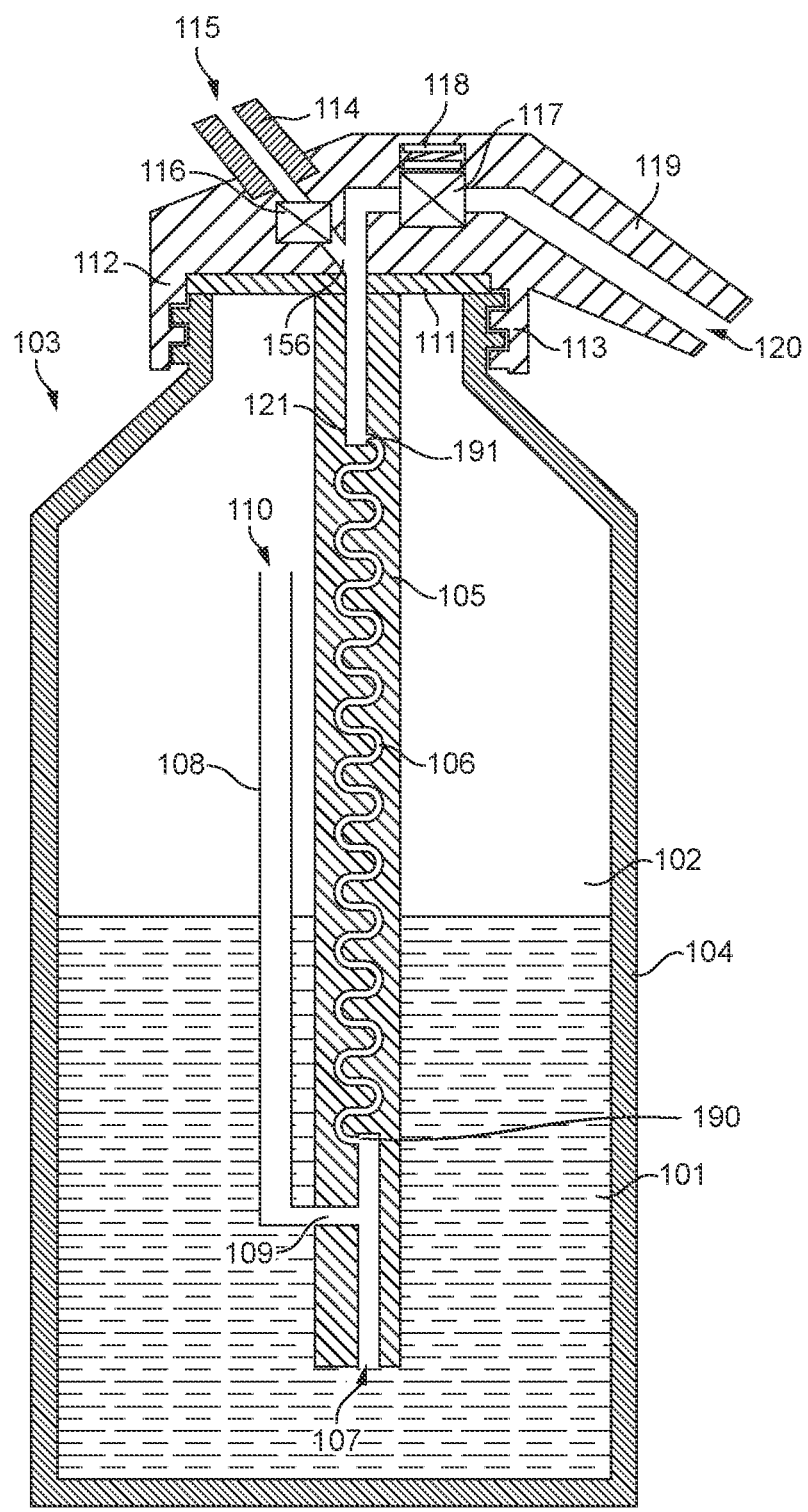
FIG. 8 is a side sectional view of a device according to the invention for delivering a microfoam.
Figure 10:
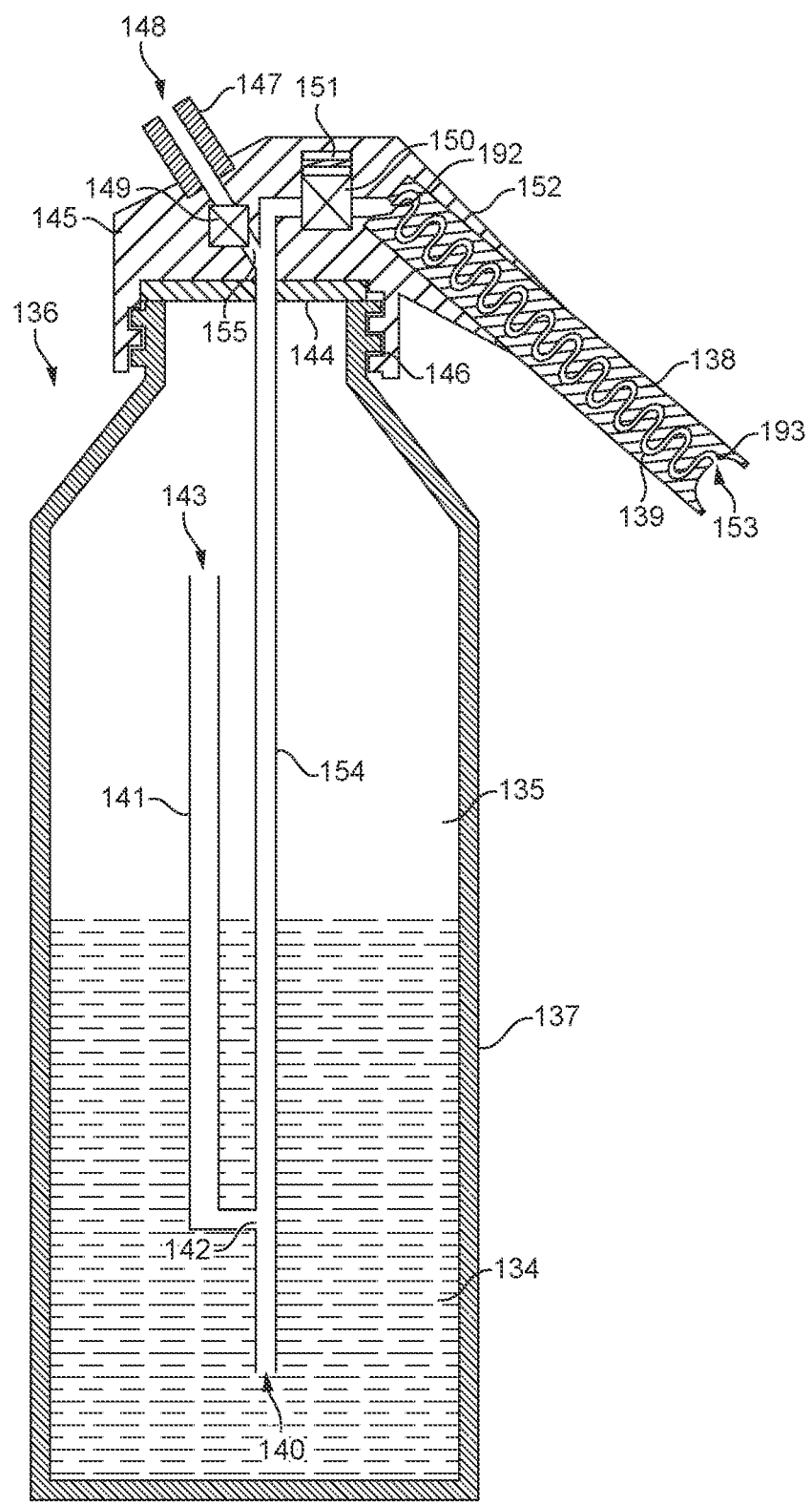
FIG. 10 is a side sectional view of a second device according to the invention for delivering a microfoam.

FIGS. 8 and 10 illustrate two different embodiments of a microfoam generating device comprising a pressurised container. These devices are rechargeable, refillable aerosols, although they could be disposable and could contain any gas as described herein.

The first embodiment of a rechargeable refillable aerosol in FIG. 8 comprises a retaining vessel 104, for holding a foamable fluid 101, a headspace of compressed gas 102, and a microfoaming section 105 with gas conduit 108. Additionally, there is a screw-fit cap assembly 112, 113 with seal 111, incorporating a pressurised gas charging port 115 with one-way valve 116, and a hand actuated valve-spring assembly 117, 118 and nozzle 119 for the control and dispensing of microfoam.

The aerosol device is initially filled with foamable fluid at atmospheric pressure 103. The cap assembly 112 is then applied to the retaining vessel 104 sealing the vessel contents from the external atmosphere via interlocking screw threads 113, a compressible seal 111, and closed valves 116, 117 within the flow paths of the cap. The headspace 102 of the device is pressurised to the required level via connecting the high-pressure gas connector 114 to an external charging supply of the desired gas. Charging supplies of gas may be provided by air pumps, gas compressors, pressurised gas header tanks, pressurised gas cylinders, and small volume pressurised gas bulbs. The charging gas passes through a one-way valve 116, allowing gas into, but not out of the device. The gas flow then passes into the retaining vessel 104 via the charging gas-microfoam channel junction 156, and then through the flow channel 106 within the microfoaming section 105. Use of the microfoam channel 121 and spatially oscillating flow channel of the microfoaming section 105 as a common conduit for the charging gas has the advantage of the pressurised gas flow back-flushing the channels of obstructions from dried or accreted materials from the foamable fluid or contamination. Once the desired gas pressure has been obtained within the retaining vessel 104 the external gas supply may be disconnected from the high-pressure gas connector 114. Microfoams of the foamable liquid 101 is then produced by opening the hand actuated valve 117. The valve 117 and its return spring 118 can be actuated by a number of means known in the art, such as levers, triggers and buttons (not shown). Also, the position of the return spring 118 relative to the valve 117 may vary with respect to the choice of hand actuation design. Opening valve 117 allows a pressure release for the pressurised system within the retaining vessel 104. The pressure release results in the foamable fluid 101 flowing into the foaming device fluid inlet 107 (foamable-liquid inlet), and pressurised gas flowing into the inlet 110 (pressurized gas inlet) of the gas conduit 108, which is positioned within the gas headspace clear of the foamable fluid level. The flows of pressurised gas in the gas conduit 108 and the foamable liquid from the inlet 107 meet at the gas-liquid junction 109, where the gas is incorporated into the liquid flow. The combined pressurized gas and foamable liquid then enters the oscillating flow channel 106 via an inlet 190 (gas-liquid inlet), in which microfoam is then generated as the biphasic fluid flow passes through the oscillating channel 106 in the microfoaming device 105. The microfoam then flows out of the microfoaming device 105 via an outlet 191 (gas-liquid outlet), through the microfoam flow channel 122 and the open valve 117. The microfoam finally exits the device 120 through the nozzle 119. Microfoam generation ceases when the hand actuator (lever, trigger or button) is released and the valve return spring 118 closes valve 117, equalising the system pressure within the device. The valve 117 and its return spring 118 can be actuated by a number of means known in the art, such as levers, triggers and buttons (not shown). Also, the position of the return spring 118 relative to the valve 117 may vary with respect to the choice of hand actuation design. Opening valve 117 allows a pressure release for the pressurised system within the retaining vessel 104. The pressure release results in the foamable fluid 101 flowing into the foaming device fluid inlet 107, and pressurised gas flowing into the inlet 110 of the gas conduit 108, which is positioned within the gas headspace clear of the foamable fluid level. The flows of pressurised gas in the gas conduit 108 and the foamable liquid from the inlet 107 meet at the gas-liquid junction 109, where the gas is incorporated into the liquid flow. The microfoam is then generated as the biphasic fluid flow passes through the oscillating channel 106 in the microfoaming device 105. The microfoam then flows out of the microfoaming device 105, through the microfoam flow channel 122 and the open valve 117. The microfoam finally exits the device 120 through the nozzle 119. Microfoam generation ceases when the hand actuator (lever, trigger or button) is released and the valve return spring 118 closes valve 117 equalising the system pressure within the device.

This aerosol device can be recharged with gas at any time during use by connecting the sealed device to an external charging gas supply via the high-pressure gas connector 114. To refill the aerosol with foamable fluid residual gas pressure is released by hand actuation of valve 117. Once the aerosol has equalised with atmospheric pressure 103 the hand actuator is released closing valve 117, and the cap can then be safely removed for refilling the device with foamable fluid.

Figure 9:
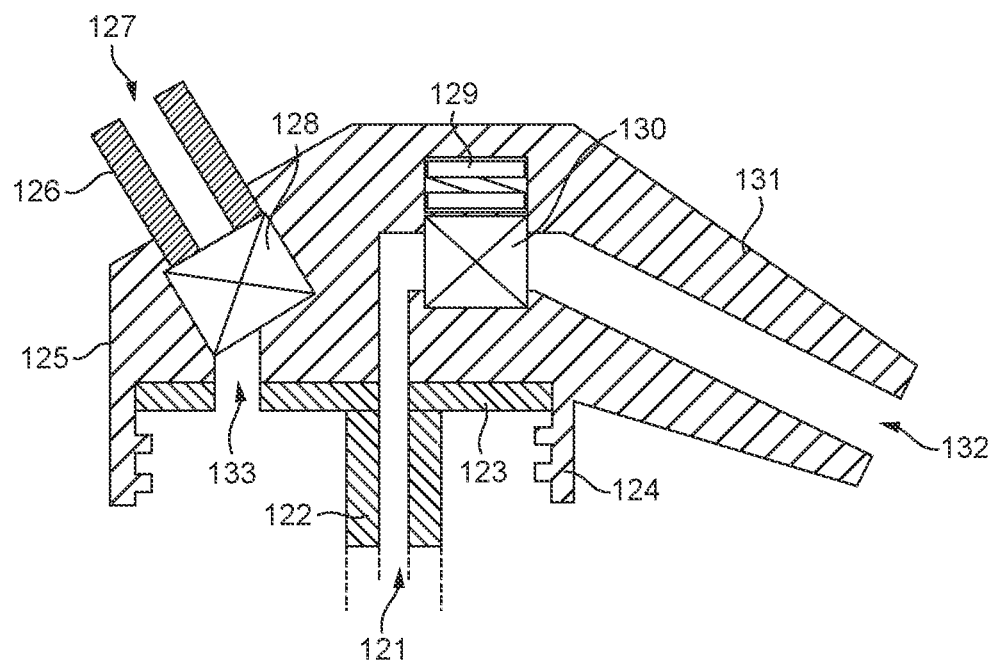
FIG. 9 is a side sectional view of a variant of the device shown in FIG. 8 showing the cap assembly only.

A variant of the rechargeable, refillable aerosol embodiment illustrated in FIG. 8 can be seen in FIG. 9. FIG. 9 shows only the screw-threaded cap assembly 124, 125 of the entire device. In this variant, the charging gas flow from the pressurised gas charging port 127 passes through a one-way valve 128, and then through the charging gas outlet 133 directly into the compressed gas headspace 102 through a separate aperture in the seal 123 without connection to the microfoam flow channel 121 via the charging gas-microfoam channel junction 156. All other aspects of the cap assembly 125; the quick release, high pressure gas connector 126, hand actuated valve and return spring 130, 129, nozzle 131, microfoaming section 122 with gas conduit (not shown), and microfoam exit flow 132, are as described for FIG. 8. Such a variant may be advantageous for systems where it is undesirable for the foamable fluid to undergo pre-shear and gasification prior to microfoaming.

A second embodiment of a rechargeable refillable aerosol for the generation and dispensing of microfoams is illustrated in FIG. 10. This embodiment comprises a retaining vessel 137, for holding a foamable fluid 134, a headspace of compressed gas 135, and a dip tube 154 with gas conduit 141. Additionally, there is a screw-fit cap assembly 145, 146 with seal 144, incorporating a pressurised gas charging port 148 with one-way valve 149, a hand actuated valve-spring assembly 150, 151 and nozzle 152 housing a microfoaming section 138. The microfoaming section 138 may be integral to the nozzle, but it may also be detachable to enable cleaning, replacement, or interchange with microfoaming sections of different design. The aerosol device is initially filled with foamable fluid at atmospheric pressure 136. The cap assembly 145 is then applied to the retaining vessel 137, sealing the vessel contents from the external atmosphere via interlocking screw threads 146, a compressible seal 144, and closed valves 149, 150 within the flow paths of the cap 145, 146. The headspace 135 of the device is pressurised to the required level via connecting the high-pressure gas connector 147 to an external charging supply of the desired gas. As for the first aerosol embodiment, charging supplies of gas may be provided by air pumps, gas compressors, pressurised gas header tanks, pressurised gas cylinders, and small volume pressurised gas bulbs. The charging gas passes through a one-way valve 149 and into the retaining vessel 137 via the charging gas-dip tube junction 155, and then through the dip tube 154 and gas conduit 141 and exits at the dip tube inlet 140 and the gas conduit inlet 143. Once the desired gas pressure has been obtained within the retaining vessel 137 the external gas supply may be disconnected from the high-pressure gas connector 147. Microfoams of the foamable liquid 134 are then produced by opening the hand actuated valve 150. The valve 150 and its return spring 151 can be actuated by a number of means known in the art, such as levers, triggers and buttons (not shown). Also, the position of the return spring 151 relative to the valve 150 may vary with respect to the choice of hand actuation design. Opening valve 150 allows a pressure release for the pressurised system within the retaining vessel 137. The pressure release results in the foamable fluid 134 flowing into the dip tube inlet 140, and pressurised gas flowing into the inlet 143 of the gas conduit 141, which is positioned within the gas headspace clear of the foamable fluid level. The flows of pressurised gas in the gas conduit 141 and the dip tube inlet 140 meet at the gas-liquid junction 142, where the gas is incorporated into the liquid flow. The biphasic fluid flow passes through the dip tube 154 and open valve 150, then entering via an inlet 192 the oscillating flow path 139 of the microfoaming section 138 located in the nozzle 152 of the cap assembly 145. The generated microfoam finally flows out of the end microfoaming section 153 via an outlet 193, and is dispensed for use. Microfoam generation ceases when the hand actuator (lever, trigger or button) is released and the valve return spring 151 closes valve 150, equalising the system pressure within the device.

The rechargeable, refillable aerosol device in FIG. 10 can be recharged with gas at any time during use by connecting the sealed device to an external charging gas supply via the high-pressure gas connector 147. To refill the aerosol with foamable fluid, residual gas pressure is released by hand actuation of valve 150. Once the aerosol has equalised with atmospheric pressure 136, the hand actuator is released, closing valve 150, and the cap can then be safely removed for refilling the device with foamable fluid.

A variant of the aerosol device in FIG. 10 can be made consistent with the changes in the charging gas flow path described in FIG. 9. In the case of this second embodiment (FIG. 10), the charging gas flow, from the quick release, high pressure gas connector 147, would enter directly into the pressurised headspace 135 through a dedicated charging gas outlet, and not flow in through the dip tube 154 via the charging gas-dip tube junction 155. Again, this design is advantageous for systems where it is undesirable for the foamable fluid to undergo pre-shear and gasification prior to microfoaming.

Alternatively, the aerosol embodiments shown in FIGS. 8 and 10 may be filled with foamable fluid through the nozzle with the hand actuated valve in the open position, negating the need to remove and replace the cap assembly.

Although not shown, in FIGS. 8, 9 and 10 a pressure release valve may be incorporated into the retaining vessel 104 (FIG. 8), 137 (FIG. 10), or the cap assembly 112 (FIG. 8), 125 (FIG. 9) and 145 (FIG. 10), to prevent over-pressurisation and may additionally be used to depressurise the system prior to refilling with foamable fluid.

A further embodiment for the current invention is a non-refillable, non-rechargable aerosol. Here the foaming sections 105 depicted in FIGS. 8, and 138, depicted in FIG. 10, would take up similar respective positions within crimp-sealed aerosol with a single hand actuated valve assembly. Such aerosols may be filled with foamable fluid prior to application of the crimp-sealed cap assembly, or back through the hand actuated valve after the application of the crimp sealed cap assembly. The aerosols would be pressurised by filling with pressurised charging gas through the hand actuated valve assembly.

Alternatively, the arrangement shown in FIG. 10 could comprise a bag containing the dip tube 154, gas conduit 141 and foamable liquid 134. The foamer would still be integrated into the nozzle, as shown in FIG. 10.

Figure 11:
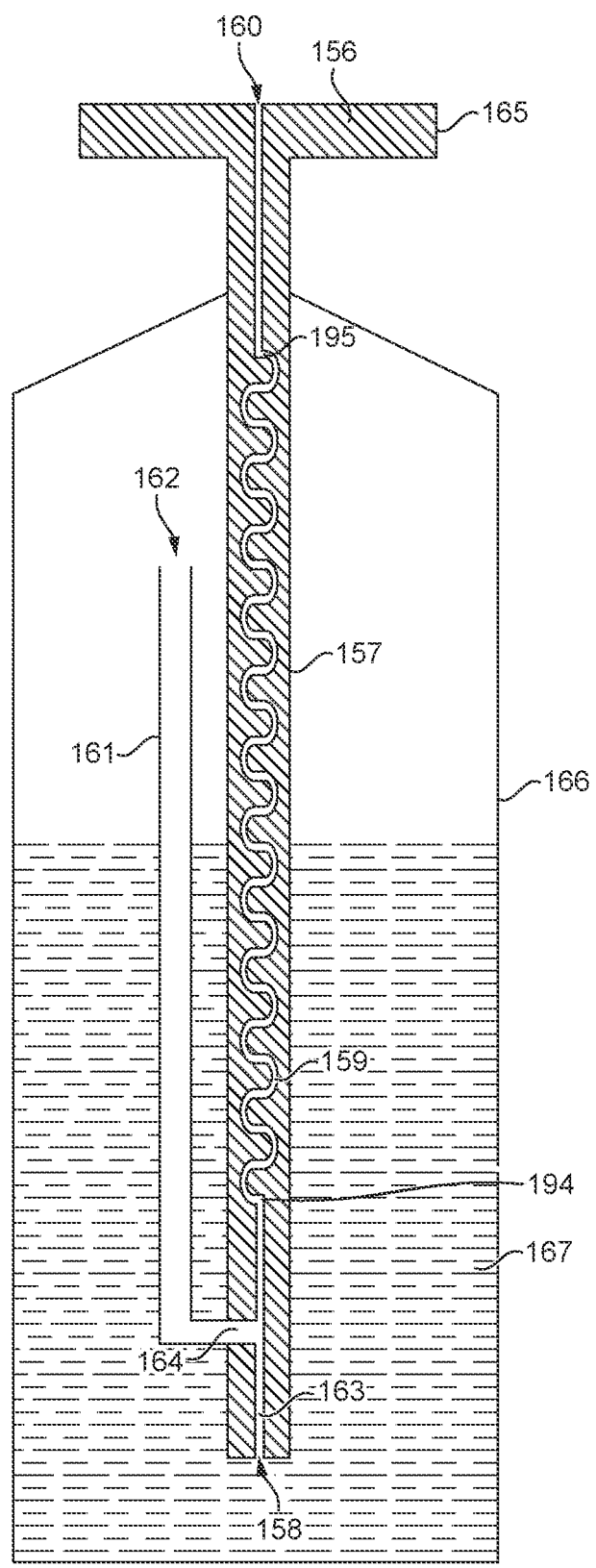
FIG. 11 is a side sectional view of an embodiment of functional packaging for use with a dispensing device.

Another embodiment of the current invention is functional packaging for a foamable fluid for use in a durable or semi-durable foam dispensing device. This functional packaging is disposable, and more preferably recyclable. An example of such functional packaging is shown in FIG. 11. The packaging comprises a seal-foamer assembly 156 having a dip tube 157 with a single continuous flow path formed by a liquid inlet 158, an oscillating flow path 159, and a microfoam outlet 160. The assembly a has an attached gas conduit 161 with a gas inlet 162, which intersects the liquid inlet flow path 163 to form a gas-liquid mixing junction 164. The combined gas and foamable liquid enter the oscillating flow path 159 via an inlet 194 (gas-liquid inlet) and exit the oscillating flow path 159 via an outlet 195 (gas-liquid outlet). The gas conduit 161 may be attached to the dip tube 157, as shown, but may be integrated into the dip tube 157 to form a single compact structure (not shown). The seal-foamer assembly 156 also has a seal flange 165 capable of forming a pressure seal with the durable or semi durable foam dispensing device shown in FIG. 12. Attached to the seal-foamer assembly 156 is a liquid retainer 166. The liquid retainer 166 is attached in such a way as to form a complete seal with the seal-foamer assembly 156, and acts as a leak-proof liquid container. The liquid retainer 166 may be rigid and made of any appropriate material, but may also be a flexible pouch, preferably formed from barriered plastics or plastic-metal laminates. The liquid retainer 166 contains the foamable fluid 167 and encloses the dip tube 157 of the seal foamer assembly 156 and the gas conduit 161. The foamable fluid 167 may be introduced into the liquid retainer 166 via the microfoam outlet 160, through an opening such as a seam in the liquid retainer, that is sealed after filling, or via a port or valve integrated into the wall of the liquid retainer (not shown). The foamable fluid 167 will be filled into the liquid retainer 166 in such a way that there is either no gas in the headspace 189, or there is a headspace 189 of a desired gas or gas mixture at or below atmospheric pressure. The packaging may also have a removable or frangible seal (not shown) applied to the microfoam outlet 160 to prevent leaks, protect the foamable fluid from contamination, and retain a desired headspace condition. If the liquid retainer 166 is formed from a flexible pouch it may be rolled or folded in such a way as to reduce space for storage and facilitate insertion into the durable foam dispensing device shown in FIG. 12. The folded or rolled fluid retainer may be additionally sleeved with a removable or frangible cover made of plastic, metal foil, paper, card or other suitable material for stability and to aid insertion into the foam dispensing device.

Figure 12:
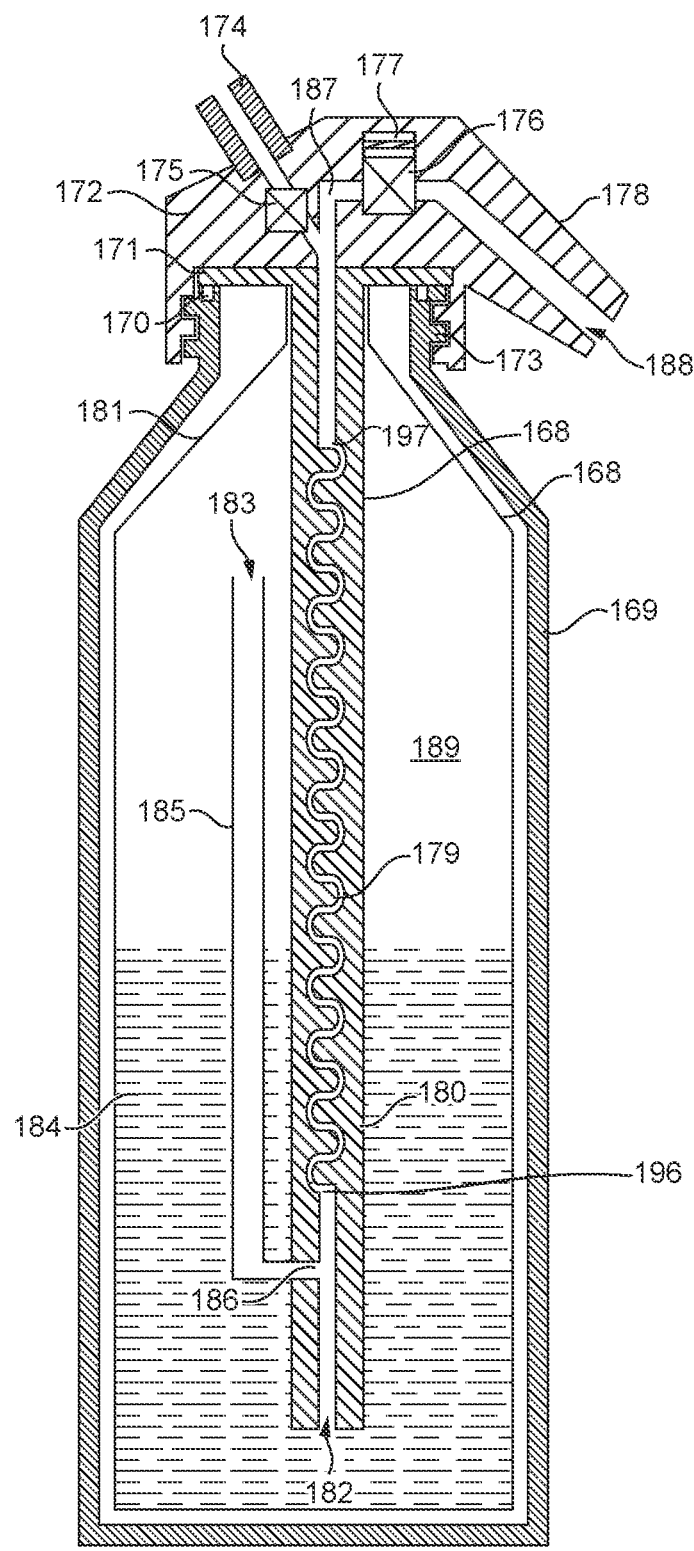
FIG. 12 is a side sectional view of the packaging of FIG. 11 assembled with a dispensing device.

The example functional packaging embodiment, shown in FIG. 11, is designed for use in the durable foam dispensing device shown in FIG. 12. Prior to use, any removable seals or secondary packaging may be removed from the functional packaging 168, which is then inserted into the retaining vessel 169 of the foam generating device. The retaining vessel may have an O-ring, or gasket 170 at the interface with the seal flange 171 of the functional packaging 168 to provide a pressure seal. Alternatively, the seal flange 171 of the functional packaging 168 may incorporate its own O-ring or gasket, or be formed from a compliant material suitable for forming a pressure seal under compression. The cap assembly 172 is secured to the retaining vessel 169 via a screw tread 173, or other suitable mechanism, sealing the device flow paths from the external atmosphere. The cap assembly incorporates a pressurised gas charging port 174 with one-way valve 175, a hand actuated valve spring assembly 176, 177 and dispensing nozzle 178. The device is charged to the desired pressure with the required gas or gas mixture via the pressurised gas charging port 174. The pressurised gas supply may be provided by air pumps, gas compressors, pressurised gas cylinders or small volume pressurised gas bulbs. On charging the foam dispensing device the charging gas passes through the oscillating flow path 179 of the functional packaging dip tube 180, exiting into the liquid retainer 181 via the liquid inlet 182 and gas inlet 183 of the gas conduit 185. The liquid retainer 181, if a flexible pouch, has an inflated volume equal to or greater than the volume of the retaining vessel 169 of the device. If the liquid retainer 181 is rigid it may have a volume that allows maximum fit in the retaining vessel, or be capable of retaining an elevated pressure if smaller in volume of the retaining vessel. Once the desired gas pressure has been reached within the headspace 189 of the functional packaging 168 the external gas supply may be disconnected from the high-pressure gas charging port 174.

Microfoams of the foamable fluid 184 are then produced by opening the hand actuated valve 176. The valve 176 and its return spring 177 can be actuated by a number of means known in the art, such as levers, triggers and buttons (not shown). Also, the position of the return spring 177 relative to the valve 176 may vary with respect to the choice of hand actuation design. Opening valve 176 allows a pressure release for the pressurised liquid retainer 181 within the retaining vessel 169. The pressure release results in the foamable fluid 184 flowing into the dip tube 180 via the fluid inlet 182 (foamable-liquid inlet), and pressurised gas flowing into the inlet 183 (pressurized gas inlet) of the gas conduit 185, which is positioned within the gas headspace above the foamable fluid level. The flows of pressurised gas in the gas conduit 185 and the dip tube inlet 182 meet at the gas-liquid junction 186, where the gas is incorporated into the liquid flow. The biphasic fluid flow passes into the oscillating channel 178 in the dip tube 179 via an inlet 196 (liquid-gas inlet) where It is converted into a microfoam. The microfoam then flows out of the oscillating channel 178 via an outlet 197 (liquid-gas outlet) and ultimately out of the functional packaging 168, through the cap microfoam flow channel 187 and the open valve 176. The microfoam finally exits the device 188 through the nozzle 178. Microfoam generation ceases when the hand actuator (lever, trigger or button) is released and the valve return spring 177 closes valve 176 equalising the system pressure within the device.

This device can be recharged with gas at any time during use by connecting the sealed device to an external charging gas supply via the high-pressure gas connector 174. When the foamable fluid 184 within the functional packaging 168 is spent, the residual gas pressure is released by hand actuation of valve 176. Once the device has equalised with atmospheric pressure the hand actuator is released, closing valve 176, and the cap can then be safely removed. The functional packaging 168 is then removed from the retaining vessel 169 and disposed of or recycled. New functional packaging 168 is inserted into the retaining vessel and the process is repeated.

The invention claimed is:

1. An apparatus for generating a microfoam, the apparatus comprising:
   a source of foamable liquid and pressurized gas; and
   a spatially oscillating flow channel having an inlet and an outlet;
   wherein the source of foamable liquid and pressurised gas and the spatially oscillating flow channel are arranged to feed the foamable liquid and pressurized gas into the inlet and to the outlet;
   wherein the spatially oscillating flow channel provides an oscillating flow direction, oscillates about a bulk flow direction, and has a sequence of planar cross-sections that are perpendicular to the oscillating flow direction, with a sub-sequence of planar cross-sections that are perpendicular to the bulk flow direction;
   wherein each of at least ten planar cross-sections in the sub-sequence do not overlap with either of two adjacent planar cross-sections in the sub-sequence; and
   wherein the spatially oscillating flow channel is a single channel with no splits and re-merging of channels between the inlet and the outlet.

2. The apparatus according to claim 1, wherein each of all of the planar cross-sections in the sub-sequence do not overlap with either of the two adjacent planar cross-sections in the sub-sequence.

3. The apparatus according to claim 1, wherein the average cross sectional area of the spatially oscillating flow channel is from 0.5 to 5 mm$^2$.

4. The apparatus according to claim 1, wherein the average distance between planar cross-sections in the sub-sequence is from 0.5 to 20 mm.

5. The apparatus according to claim 1, wherein the spatially oscillating flow channel is made of plastic.

6. The apparatus according to claim 1, wherein the spatially oscillating flow channel is made from a 3D printer.

7. The apparatus according to claim 1, wherein the apparatus further comprises a pressurised container comprising an openable and closable outlet, the container containing the source of foamable liquid and pressurized gas, wherein the outlet is coupled to the openable and closable outlet of the apparatus, such that when the openable and closable outlet is opened, the pressure difference between the inside of the container and the pressure at the outlet is sufficient to drive the foamable liquid and pressurized gas into the inlet, thereby generating a microfoam which exits the outlet and, in turn, the openable and closable outlet of the apparatus.

8. The apparatus according to claim 1, wherein the oscillating flow channel is not a helix.

9. A method of generating a microfoam, the method employing an apparatus comprising a spatially oscillating flow channel having an inlet and an outlet, the method comprising feeding a gas and a foamable liquid into the inlet of the spatially oscillating flow channel under pressure, wherein the spatially oscillating flow channel provides an oscillating flow direction, oscillates about a bulk flow direction, and has a sequence of planar cross-sections that are perpendicular to the oscillating flow direction, with a sub-sequence of planar cross-sections that are perpendicular to the bulk flow direction, wherein each of at least ten planar cross-sections in the sub-sequence do not overlap with either of two adjacent planar cross-sections in the sub-sequence, and wherein the spatially oscillating flow channel is a single channel with no splits and re-merging of channels.

10. The method according to claim 9, wherein the foamable liquid is a dairy product or a synthetic equivalent.

11. The method according to claim 9, wherein the gas consists of air, nitrogen, hydrocarbon, carbon dioxide, nitrous oxide or mixtures thereof.

12. The method according to claim 9, wherein the microfoam has a mean bubble diameter of less than 100 microns.

13. An apparatus for generating a microfoam, the apparatus comprising:
   a source of foamable liquid and pressurised gas; and
   a dip tube extending into the source of foamable liquid and pressurized gas, wherein the dip tube comprises:
      a pressurized-gas inlet;
      a foamable-liquid inlet;
      a gas-liquid junction; and
      a spatially oscillating flow channel having a gas-liquid inlet and a gas-liquid outlet;
   wherein the source of foamable liquid and pressurised gas and the dip tube are arranged to feed the pressurized gas into the pressurized-gas inlet and to the gas-liquid junction, the foamable liquid into the foamable-liquid inlet and to the gas-liquid junction, and combined pressurized gas and foamable liquid from the gas-liquid junction to the gas-liquid inlet of the spatially oscillating flow channel and to the gas-liquid outlet of the spatially oscillating flow channel;
   wherein the oscillating flow channel provides an oscillating flow direction, oscillates about a bulk flow direction, and has a sequence of planar cross-sections that are perpendicular to the oscillating flow direction, with a sub-sequence of planar cross-sections that are perpendicular to the bulk flow direction;
   wherein each of at least ten planar cross-sections in the sub-sequence do not overlap with either of two adjacent planar cross-sections in the sub-sequence; and
   wherein the spatially oscillating flow channel is a single channel with no splits and re-merging of channels between the gas-liquid inlet and the gas-liquid outlet.

14. The apparatus according to claim 13, wherein the oscillating flow channel is not a helix.

\* \* \* \* \*